May 23, 1939.  S. A. PLATT  2,159,489
ELECTRIC CORN POPPER
Filed July 28, 1937   2 Sheets-Sheet 1
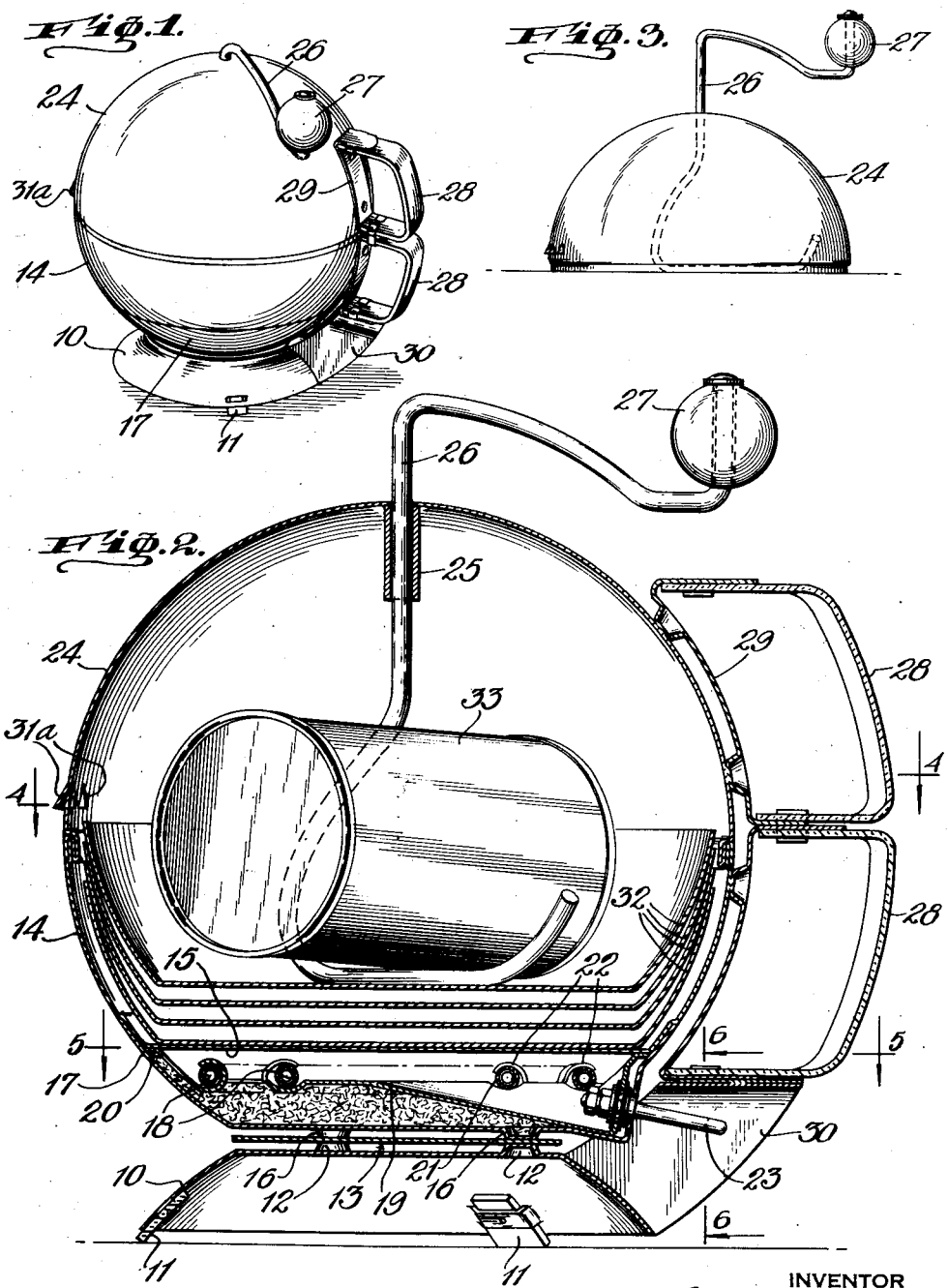
INVENTOR
Stephen A. Platt
BY
Kenyon & Kenyon
ATTORNEYS.

May 23, 1939.  S. A. PLATT  2,159,489
ELECTRIC CORN POPPER
Filed July 28, 1937   2 Sheets-Sheet 2
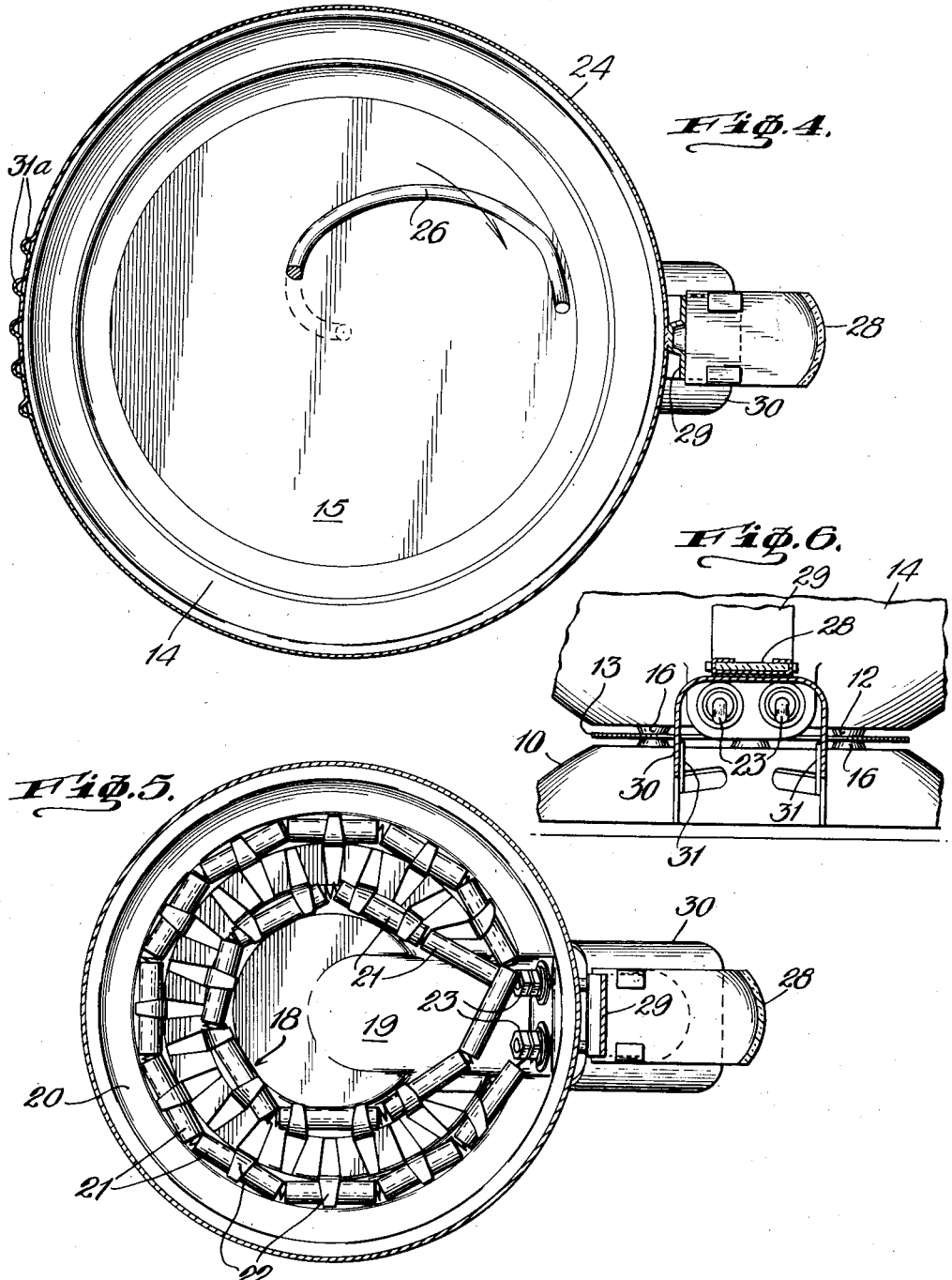

Patented May 23, 1939

2,159,489

UNITED STATES PATENT OFFICE 2,159,489

ELECTRIC CORN POPPER

Stephen A. Platt, Decatur, Ill.

Application July 28, 1937, Serial No. 156,099

7 Claims. (Cl. 219—19)

This invention relates to electrically heated corn poppers.

An object of this invention is a corn popper having provision for uniformly distributing heat to the popping pan for minimizing radiation of heat from the bottom of the popper for presenting cool lifting handles, for shielding the electrical terminals, for permitting escape of steam without inconvenience to the operator, for cleaning and for storing corn bowls and a supply of corn within the popper when the latter is not in use.

A corn popper embodying the invention consists of a two-part housing of substantially spherical contour in the bottom half of which is provided a popping pan and associated heater and in the top part of which is rotatably supported a stirrer having an exterior operating handle. The lower part of the housing has a flattened portion which engages and is supported by a base. A handle member is attached to each of the two parts and these handle members are so arranged that they may be simultaneously grasped by a single hand to hold the popper while the stirring handle is operated with the other hand or to lift the popper and move the same about as desired. Between the lower end of the handle for the bottom part and the base is arranged a U-shaped shield within which are arranged the terminals for the heating element. Between the latter and the bottom of the housing is provided mineral wool or other heat-insulating material and the housing is supported from the base through the intermediary of the small projections between which is arranged a shield, thus minimizing transfer of heat from the housing to the base and thus protecting the surface of a table or the like upon which the popper may be resting.

Other objects, novel features and advantages of this invention will become apparent from the following specification and accompanying drawings, wherein:

Fig. 1 is a perspective view of a corn popper embodying the invention;

Fig. 2 is an enlarged vertical section showing corn bowls and a can of corn arranged within the popper;

Fig. 3 is an elevation of the top part of the housing resting on a flat surface;

Fig. 4 is a section on the line 4—4 of Fig. 2;

Fig. 5 is a section on the line 5—5 of Fig. 2; and

Fig. 6 is a section on the line 6—6 of Fig. 2.

An inverted bowl-shaped base 10 of sheet material is provided with legs 11 of heat insulating material and has several struck-up projections 12 on which is supported a baffle 13. An approximately semi-spherical sheet metal member 14 has a flat bottom 15 and is inwardly offset slightly above its bottom. A pan 17 has its rim fitting into and welded to the offset portion. The flat bottom of the pan 17 is provided with down-struck projections 16 which engage the baffle 13 in register with the projections 12, the projections 12 and 16 being spot welded to the baffle 13. The flat bottom 15 constitutes the popping plate and in the space between the bottom 15 and the pan 17 is arranged an electrical heating unit supported by a metal tray having a horizontal flange 20 engaging the bottom 15. The heating unit comprises the usual resistance wire encased in insulators 21 which are held in place of metal tabs 22 struck out of the tray 19 and bent over the insulators. The terminals 23 for the heating element are attached to the tray 19 and project through holes in the member 17.

The housing of the corn popper is made up of the member 14 together with a co-operating semi-spherical cover 24 having its rim offset inwardly to fit within the rim of the member 14. A sleeve 25 is welded to the cover 24 in alinement with an aperture through which extends the shaft of the stirrer 26. The lower end of the stirrer is provided with a horizontal portion which is adapted to engage the bottom of the member 14 and agitate the corn during the operation of the popper. Also, the stirrer 26 is provided with an external handle having a knob 27 by which rotation of the stirrer is effected manually. Each of the housing portions 14 and 24 is provided with a handle which consists of a tough fiber member 28 of low heat conductivity, the ends of which are mechanically fastened to a metallic member 29 spot welded to the housing. These two handles are arranged so that when the cover 24 is positioned on the bowl portion 14, the adjacent ends of the handles are in contact, thereby making it possible to grip both of them with a single hand. A U-shaped metallic member 30 is attached to the base 10 through the medium of tongues 31 struck out of the base and welded to the member 30. The horizontal portion of the shield 30 engages and is spot-welded to the bottom portion of the lower handle and also overlies the terminals 23 to protect the same.

A plurality of vents 31a are provided in the cover 24 near its rim at a location diametrically opposed to the handles. These vents permit the escape of steam during the operation of popping corn and are so arranged that the steam is vented at a point removed from the path of the knob 27, thereby preventing inconvenience to the operator, since there is no chance for the steam to engage the hand which is operating the stirrer. To form the vents tabs are struck out from the cover 24 and these tabs constitute shields to direct the escaping gases away from the stirrer handle.

The shaft portion of the stirrer is of such length that the horizontal portion of the stirrer may be lifted as high as the rim of the cover, thereby making it possible to arrange the cover in the position shown in Fig. 3 for drainage purposes, while at the same time permitting the horizontal portion to engage the bottom 15 during the normal operation of the popper.

As shown in Fig. 2, the popper when not in use may be utilized to store a plurality of nested bowls 32 in which the popped corn may be served. Also, a can of pop corn 33 may be arranged within the popper, the bottom end of the stirrer 26 being suitably curved to receive the same. With this arrangement, it is convenient to ship a complete corn popper outfit consisting of the popper itself, a plurality of serving bowls and a supply of pop corn. Also, when the popper is not in use, the bowls and pop corn may be conveniently stored within the popper.

The popper above described may be used for popping corn in oil or melted butter without any possibility of the oil or butter working to the outside of the housing inasmuch as a tight joint is provided between the top and bottom of the housing. Also, the handle arrangement permits easy manipulation of the popper, particularly when it is desired to remove the popped corn therefrom, the handles providing a cool grip at all times. Safety against trouble with the heating unit through damage to the terminals 23 is afforded by the shield 30.

I claim:

1. In a corn popper, a semi-spherical member having a flat portion, a pan parallel to said portion and having a flange engaging and secured to the outer surface of said member, a tray having a horizontal flange attached to the bottom of said flat portion, an electrical heating element contained within said tray, insulating members enclosing said element, and tabs struck up from said tray and clinched over said insulating members.

2. A corn popper comprising a two-part substantially spherical housing, a popping plate in one part, a stirrer journalled in the other part and having a portion adapted to engage said plate, said stirrer being arranged for sufficient axial movement to locate said plate-engaging portion above the rim of the part in which said stirrer is journalled and the part which carries the stirrer being of sufficient depth to receive entirely the lower portion of the stirrer, whereby when the stirrer carrying part of the housing is removed it may be supported on its rim with the stirrer housed within it.

3. A corn popper comprising a two-part housing, the first of said parts being semi-spherical and the second part being semi-spherical with a flat portion constituting a popping plate, electric heating means beneath said popping plate, a base, means including a heat baffle supporting said housing from said base, a stirrer rotatably mounted in said first housing part and having a flat portion for engagement with said popping plate, a handle carried by each housing part and terminating adjacent the rim thereof whereby said handles are arrangeable to be gripped by a single hand, and gas venting means in said first housing part opposite the handle therefor, said vents being provided with shields to direct escaping gases away from the stirrer handle.

4. A corn popper comprising a two-part housing, the first of said parts being semi-spherical and the second part being semi-spherical with a flat portion constituting a popping plate, a stirrer rotatably mounted in said first housing part and having a flat portion adapted to engage said popping plate, a pan parallel to the flat portion of said second part and having a flange engaging and secured to the outer surface of said second part, a tray resting on the bottom of said pan and consisting of a bottom and an upwardly extending wall having a horizontal flange engaging the bottom of said flat portion and an electrical heating element supported by said tray beneath said flat portion.

5. A corn popper comprising a two-part housing, the first of said parts being semi-spherical and the second part being semi-spherical with a flat portion constituting a popping plate, said semi-spherical parts having their rim portions detachably fitted together, a stirrer rotatably mounted in said first housing part and having a flat portion for engagement with said popping plate, electrical heating means beneath said popping plate, and a handle carried by each housing part terminating adjacent the rim thereof and consisting of contiguous upright loops whereby said handles are arrangeable to be gripped by a single hand.

6. A corn popper comprising a two-part housing, the first of said parts being semi-spherical and the second part being semi-spherical with a flat portion constituting a popping plate, electrical heating means beneath said popping plate, a stirrer rotatably mounted in said first housing part and provided with an exteriorly arranged handle and having a flat portion for engagement with said popping plate, a handle carried by each housing part terminating adjacent the rim thereof whereby said handles of the housing parts are arrangeable to be gripped by a single hand, and gas venting means in said first housing part adjacent the rim thereof and at a greater distance from the axis of the stirrer than the handle thereof, said vents being provided with exterior shields extending downwardly and outwardly to direct escaping gases away from the stirrer handle.

7. A corn popper comprising a two-part housing, the first of said parts being semi-spherical and the other part being semi-spherical with a flat bottom portion constituting a popping plate, and a stirrer rotatably mounted in said first housing part and having a flat portion for engagement with said popping plate, said stirrer being arranged for axial movement into said second housing part to locate said plate-engaging portion completely within said part and such part of the housing being of sufficient depth to receive completely the lower portion of the stirrer whereby the part of the housing in which the stirrer is mounted may when removed be supported upon its rim with the stirrer housed within it, said stirrer being also adapted to occupy a position above the popping plate to permit a set of nested bowls to be housed within the part having the flat bottom portion.

STEPHEN A. PLATT.